United States Patent
Lin et al.

(10) Patent No.: US 10,553,900 B2
(45) Date of Patent: Feb. 4, 2020

(54) GEL ELECTROLYTE AND PRECURSOR COMPOSITION THEREOF AND BATTERY

(71) Applicant: INDUSTRIAL TECHNOLOGY RESEARCH INSTITUTE, Hsinchu (TW)

(72) Inventors: Yueh-Wei Lin, Hsinchu (TW); Jason Fang, Taipei (TW); Wei-Hsin Wu, Hsinchu (TW); Chung-Hsiang Chao, Hsinchu (TW); Chih-Ching Chang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 235 days.

(21) Appl. No.: 15/250,103

(22) Filed: Aug. 29, 2016

(65) Prior Publication Data
US 2018/0019497 A1 Jan. 18, 2018

(30) Foreign Application Priority Data

Jul. 12, 2016 (TW) .............................. 105121878 A

(51) Int. Cl.
| | |
|---|---|
| *H01M 10/0565* | (2010.01) |
| *H01M 10/0525* | (2010.01) |
| *C08K 5/3445* | (2006.01) |
| *C08K 5/04* | (2006.01) |
| *C08K 3/32* | (2006.01) |
| *C08L 71/00* | (2006.01) |
| *H01M 10/0567* | (2010.01) |
| *H01M 10/052* | (2010.01) |
| *H01M 4/13* | (2010.01) |
| *H01M 4/36* | (2006.01) |

(52) U.S. Cl.
CPC ........... *H01M 10/0565* (2013.01); *C08K 3/32* (2013.01); *C08K 5/04* (2013.01); *C08K 5/3445* (2013.01); *H01M 10/0525* (2013.01); *C08L 71/00* (2013.01); *H01M 4/13* (2013.01); *H01M 4/366* (2013.01); *H01M 10/052* (2013.01); *H01M 10/0567* (2013.01); *H01M 2300/0025* (2013.01); *H01M 2300/0082* (2013.01); *H01M 2300/0085* (2013.01); *Y02E 60/122* (2013.01)

(58) Field of Classification Search
CPC ......... C08L 71/00; H01M 4/13; H01M 4/366; H01M 10/0565; H01M 10/0525; H01M 10/052; H01M 10/0567; H01M 2300/0025; H01M 2300/0082; H01M 2300/0085; Y02E 60/12; Y02E 60/122; C08K 3/32; C08K 5/04; C08K 5/3445
USPC ....................................................... 429/189
See application file for complete search history.

(56) References Cited

U.S. PATENT DOCUMENTS

| | | | |
|---|---|---|---|
| 6,066,693 A | 5/2000 | Fischer et al. | |
| 6,355,379 B1 | 3/2002 | Ohshita et al. | |
| 6,444,369 B1 | 9/2002 | Kamino et al. | |
| 6,623,981 B2 | 9/2003 | Billheimer et al. | |
| 7,776,465 B1 | 8/2010 | Hatazawa et al. | |
| 8,772,412 B2 | 7/2014 | Tsai et al. | |
| 9,166,254 B2 | 10/2015 | Tsai et al. | |
| 2008/0160404 A1* | 7/2008 | Lin ..................... | H01M 10/052 429/189 |
| 2009/0023076 A1 | 1/2009 | Takeda et al. | |
| 2012/0172593 A1* | 7/2012 | Tsai ................... | C07D 207/448 544/198 |
| 2013/0164630 A1 | 6/2013 | Ihara et al. | |
| 2014/0186718 A1* | 7/2014 | Tsai ....................... | C08L 71/00 429/303 |

FOREIGN PATENT DOCUMENTS

| | | |
|---|---|---|
| CN | 1316792 A | 10/2001 |
| CN | 1601803 A | 3/2005 |
| CN | 102142581 A | 8/2011 |
| CN | 102195087 A | 9/2011 |
| CN | 102569886 A | 7/2012 |
| CN | 102617856 A | 8/2012 |
| CN | 103904361 A | 7/2014 |
| JP | 2008-163332 A | 7/2008 |
| JP | 2012-140585 A | 7/2012 |
| JP | 2012-142260 A | 7/2012 |
| JP | 5400110 B2 | 1/2014 |
| TW | 201130188 A1 | 9/2011 |
| TW | 1422089 A | 1/2014 |
| TW | I466917 B | 1/2015 |

OTHER PUBLICATIONS

Taiwanese Office Action and Search Report for Taiwanese Application No. 105121878, dated Oct. 3, 2016.
Croce et al., "Nanocomposite polymer electrolytes for lithium batteries", Nature, vol. 394, Jul. 30, 1998, pp. 456-458.
Itoh et al., "Composite polymer electrolytes based on poly(ethylene oxide), hyperbranched polymer, BaTiO3 and LiN(CF3SO2)2", Solid State Ionics, vol. 156, 2003, pp. 393-399.
Park et al., "High-voltage cell performance and thermal stability of nanoarchitectured polyimide gel polymer electrolyte-coated LiCoO2 cathode materials", Electrochimica Acta, vol. 86, 2012, pp. 346-351.

(Continued)

*Primary Examiner* — Jonathan G Jelsma
*Assistant Examiner* — Omar M Kekia
(74) *Attorney, Agent, or Firm* — Birch, Stewart, Kolasch & Birch, LLP

(57) ABSTRACT

A precursor composition of a gel electrolyte is provided, which includes (1) meta-stable nitrogen-containing polymer, (2) gelling promoter, (3) carbonate compound, and (4) metal salt. The (1) meta-stable nitrogen-containing polymer is formed by reacting (a) nitrogen-containing heterocyclic compound with (b) maleimide compound, wherein (a) nitrogen-containing heterocyclic compound and (b) maleimide compound have a molar ratio of 1:0.1 to 1:10.

17 Claims, No Drawings

(56) References Cited

OTHER PUBLICATIONS

Park et al., "Polyimide gel polymer electrolyte-nanoencapsulated LiCoO2 cathode materials for high-voltage Li-ion batteries", Electrochemistry Communications, vol. 12, 2010, pp. 1099-1102.
Park et al., "Polymer Electrolytes Integrated with Ionic Liquids for Future Electrochemical Devices", Journal of Applied Polymer Science, 2013, pp. 2363-2376.
Japanese Notification of Reasons for Refusal for Application No. 2017-104615, dated Jun. 5, 2018, with English language translation.
Chinese Office Action for Application No. 201610605056.9, dated Mar. 21, 2019.

\* cited by examiner

GEL ELECTROLYTE AND PRECURSOR COMPOSITION THEREOF AND BATTERY

CROSS REFERENCE TO RELATED APPLICATIONS

The present application is based on, and claims priority from, Taiwan Application Serial Number 105121878, filed on Jul. 12, 2016, the disclosure of which is hereby incorporated by reference herein in its entirety.

TECHNICAL FIELD

The technical field relates to a gel electrolyte and precursor composition thereof and battery.

BACKGROUND

Lithium-ion secondary batteries are mainstream commercial products and are presently being developed to have lighter weight, higher energy capacity, a longer life span, and better safety. However, the non-aqueous electrolyte solution used in commercial batteries is prone to leakage and explosion, and thus is dangerous. Also, the dendrite present on the negative electrode of the batteries may lead to short circuits or even explosions. Further improvements are required to ensure the safety of the non-aqueous electrolyte solution for daily applications. On the other hand, polymer gel electrolyte has been developed as a safer alternative for the non-aqueous electrolyte solution. However, due to the high viscosity of the polymerized gel electrolyte, it is unlikely to use a vacuum filling process to fill the electrolyte for battery fabrication, which becomes a fabrication bottleneck. In addition, the relatively low conductivity of the conventional gel electrolyte is another problem that should be solved.

SUMMARY

One embodiment of the disclosure provides a precursor composition of a gel electrolyte, comprising: (1) meta-stable nitrogen-containing polymer, formed by reacting (a) nitrogen-containing heterocyclic compound with (b) maleimide compound, wherein (a) nitrogen-containing heterocyclic compound and (b) maleimide compound have a molar ratio of 1:0.1 to 1:10; (2) gelling promoter; (3) carbonate compound; and (4) metal salt.

One embodiment of the disclosure provides a gel electrolyte, comprising: a product of a gelling reaction of (1) meta-stable nitrogen-containing polymer, (2) gelling promoter, and (3) carbonate compound; and (4) metal salt, wherein (1) meta-stable nitrogen-containing polymer is formed by reacting (a) nitrogen-containing heterocyclic compound with (b) maleimide compound, wherein (a) nitrogen-containing heterocyclic compound and (b) maleimide compound have a molar ratio of 1:0.1 to 1:10.

One embodiment of the disclosure provides a battery, comprising: a positive electrode; a negative electrode; and the described gel electrolyte disposed between the positive electrode and the negative electrode.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

One embodiment of the disclosure provides a precursor composition of a gel electrolyte, comprising: (1) meta-stable nitrogen-containing polymer, formed by reacting (a) nitrogen-containing heterocyclic compound with (b) maleimide compound; (2) gelling promoter; (3) carbonate compound; and (4) metal salt. In one embodiment, (a) nitrogen-containing heterocyclic compound and (b) maleimide compound have a molar ratio of 1:0.1 to 1:10. In another embodiment, (a) nitrogen-containing heterocyclic compound and (b) maleimide compound have a molar ratio of 1:1 to 1:3. Too much (b) maleimide compound may precipitate from the solvent system easily, thereby fails to react well. Meta-stable nitrogen-containing polymer with an overly low molecular weight is formed by too little (b) maleimide compound, and it is not beneficial in a subsequent reaction.

In one embodiment, (a) nitrogen-containing heterocyclic compound has a chemical formula of:

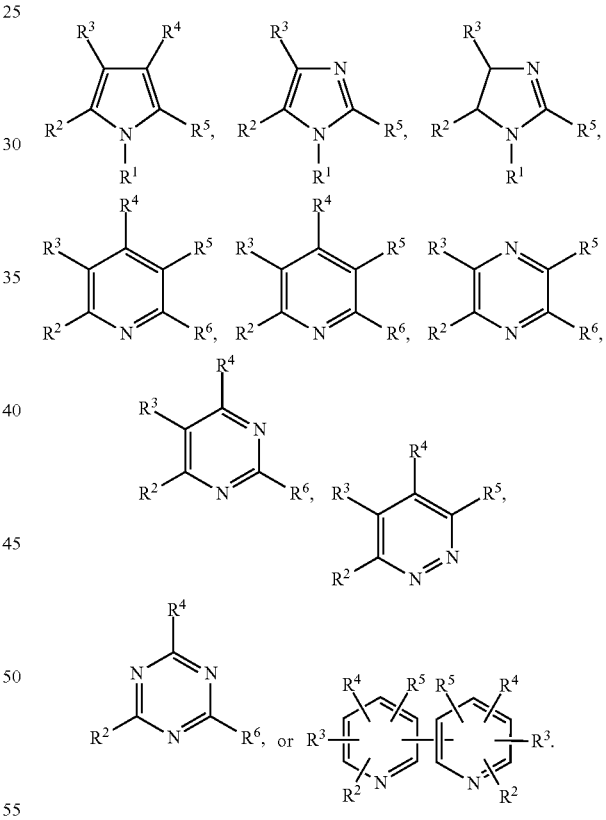

$R^1$ is hydrogen, alkyl group, alkenyl group, or phenyl group. Each of $R^2$, $R^3$, $R^4$, $R^5$, and $R^6$ is independently hydrogen, alkyl group, alkenyl group, halogen, dimethylamino, or $-NH_2$. In one embodiment, (a) nitrogen-containing heterocyclic compound is imidazole, pyrrole, pyridine, 4-tert-butylpyridine, 3-butylpyridine, 4-dimethylaminopyridine, 2,4,6-triamino-1,3,5-triazine, 2,4-dimethyl-2-imidazoline, pyridazine, pyrimidine, pyrazine, or a combination thereof.

In one embodiment, (b) maleimide compound has a chemical formula of:

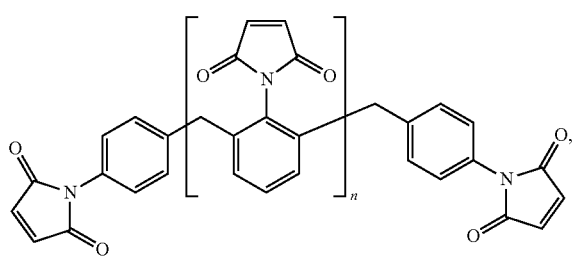

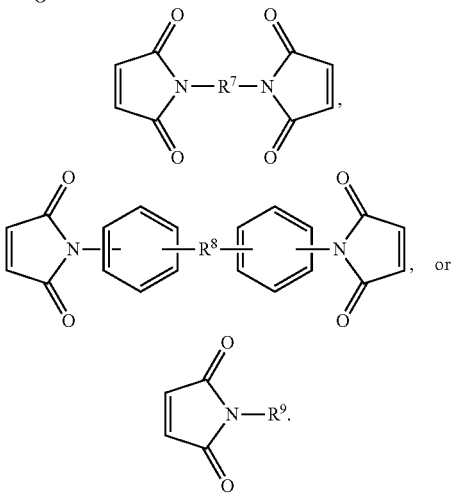

n is an integer of 0 to 4. $R^7$ is $-R^{10}CH_2R^{11}-$, $-R^{10}NHR^{10}-$, $-C(O)CH_2-$, $-R^{11}OR^{12}OR^{11}-$, $-CH_2(OCH_2)_m-$, $-C(O)-$, $-O-$, $-O-O-$, $-S-$, $-S-S-$, $-S(O)-$, $-CH_2S(O)CH_2-$, $-(O)S(O)-$, $-C_6H_4-$, $-CH_2(C_6H_4)CH_2-$, $-CH_2(C_6H_4)(O)-$, $-C_2H_4-(NHC_2H_4)-C_2H_4-$, siloxy group, biphenylene group, substituted phenylene group, or substituted biphenylene group. m is an integer of 1 to 140. $R^{10}$ is $C_{1-4}$ alkylene group, $R^{11}$ is $C_{1-4}$ alkylene group, biphenylene group, substituted phenylene group, or substituted bisphenylene group, and $R^{12}$ is $C_{1-4}$ alkylene group, substituted phenylene group or $-C_6H_4-(CCF_3)_2-C_6H_4-$, biphenylene group, or substituted biphenylene group. $R^8$ is $-CH_2-$, $-R^{13}CH_2-$, $-CH_2-(O)-$, $-C(CH_3)_2-$, $-O-$, $-O-O-$, $-S-$, $-S-S-$, $-(O)S(O)-$, $-C(CF_3)_2-$, or $-S(O)-$, and $R^{13}$ is $C_{1-4}$ alkylene group. $R^9$ is hydrogen, $C_{1-4}$ alkyl group, phenyl group, benzyl group, cyclohexyl group, sulfo group, $-C_6H_4CN$, N-methoxycarbonyl, $-C_6H_4-O(C_2H_4O)-CH_3$, $-C_2H_4-(C_2H_4O)_{11}-OCH_3$, or $-C(O)CH_3$.

In one embodiment, (b) maleimide compound is 4,4'-diphenylmethane bismaleimide, oligomer of phenylmethane maleimide, m-phenylene bismaleimide, 2,2'-bis[4-(4-maleimidophenoxy)phenyl]propane, 3,3'-dimethyl-5,5'-diethyl-4,4'-diphenylmethane bismaleimide, 4-methyl-1,3-phenylene bismaleimide, 1,6'-bismaleimide-(2,2,4-trimethyl)hexane, 4,4'-diphenylether bismaleimide, 4,4'-diphenylsulfone bismaleimide, 1,3-bis(3-maleimidophenoxy)benzene, 1,3-bis(4-maleimidophenoxy)benzene, 2,2-bis(4-(p-maleimidophenoxy)-phenyl)-hexafluoro-propane, 2,2-bis(p-maleimidophenyl)-hexafluoropropane, 1,8-bis-maleimidodiethylene glycol, tris(2-maleimidoethyl)amine, poly(ethylene glycol(11)) 4-maleimidophenyl methyl diether terminated, 4-maleimidophenol, 4-maleimido-benzenesulfonic acid, poly(ethylene glycol(11)) 2-maleimidoethyl methyl diether terminated, 2-maleimido propylene glycol 1-(2-methoxyethyl) ether, ethylene glycol 2-maleimidopropyl methyl diether, or poly(dimethsiloxane), bis(3-maleimido-propyl-dimethyl silyl) terminated.

In one embodiment, (1) meta-stable nitrogen-containing polymer and (2) gelling promoter have a weight ratio of 1:1 to 1:9. The precursor composition cannot be completely gelled by an overly low ratio of the (2) gelling promoter. Too much (2) gelling promoter easily forms solid precipitate. The (2) gelling promoter has a chemical formula of:

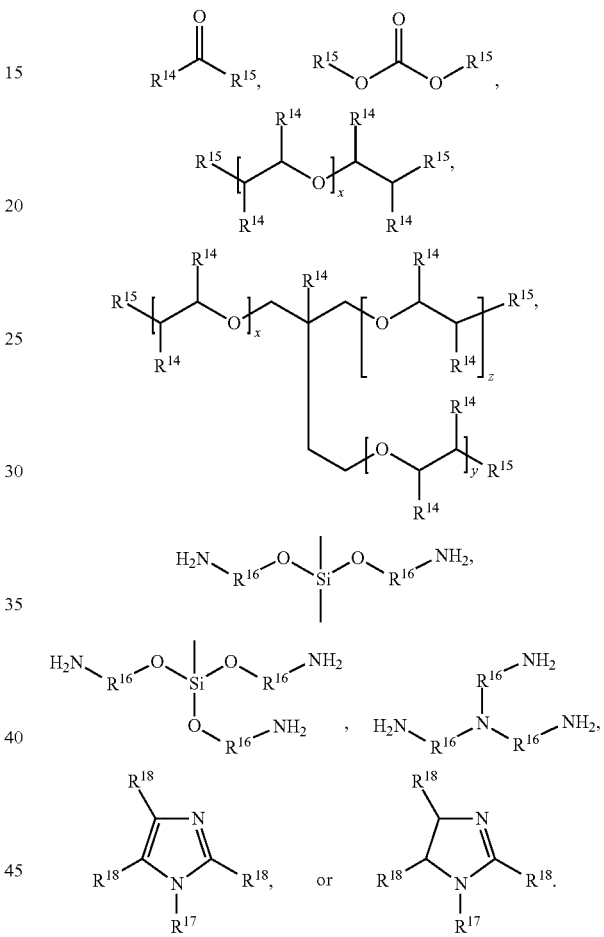

Each of $R^{14}$ is independently hydrogen, alkyl group, or alkoxy group. Each of $R^{15}$ is independently $-NH_2$, $-NR^{19}H$, acryl group, acrylate group, allyl group, or alkoxycarbonyl group, and $R^{19}$ is $C_{1-4}$ alkylene group. Each of $R^{16}$ is independently ethylene group, phenylene group, or olefin group. $R^{17}$ is hydrogen, alkyl group, alkenyl group, or phenyl group. Each of $R^{18}$ is independently hydrogen, alkyl group, alkenyl group, phenyl group, dimethylamino group, halogen, or $-NH_2$. Each of x, y, and z is independently an integer of 0 to 10.

In one embodiment, (1) meta-stable nitrogen-containing polymer and (3) carbonate compound have a weight ratio of 1:0.1 to 1:1. Too much (3) carbonate compound easily forms solid precipitate. Too little (3) carbonate compound may negatively influence the conductivity and electrical properties of a battery. In one embodiment, (3) carbonate compound has a chemical formula of:

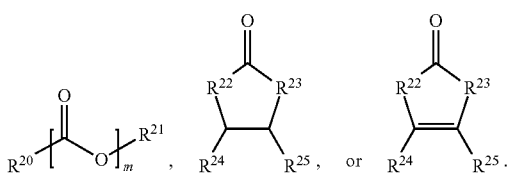

$R^{20}$ is alkyl group, alkoxy group, phenoxy group, or ester group. $R^{21}$ is alkyl group, ester group, or phenyl group. m is 1 to 5. $R^{22}$ is oxygen or sulfur. $R^{23}$ is alkylene group. Each of $R^{24}$ and $R^{25}$ are independently hydrogen, alkyl group, or halogen. In one embodiment, (3) carbonate compound can be dimethyl carbonate (DMC) or diethyl carbonate (DEC).

In one embodiment, a concentration of (4) metal salt in the gel electrolyte (and the precursor composition) is 0.5 M to 2 M. (4) Metal salt with an overly high concentration may precipitate easily to negatively influence the electrical properties of the gel electrolyte. The gel electrolyte may have insufficient conductivity due to an overly low concentration of (4) metal salt. In one embodiment, (4) metal salt can be $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO_3$, or a combination thereof.

The precursor composition of the gel electrolyte can be used to manufacture a battery. The battery includes a casing to define a hollow space to accommodate a positive electrode, a negative electrode, and a gel electrolyte between the positive and negative electrodes. The positive electrode and the negative electrode are assembled in the casing, and the precursor composition liquid is injected into the hollow space. The precursor composition is then heated to perform a gelling reaction of (1) meta-stable nitrogen-containing polymer, (2) gelling promoter, and (3) carbonate compound. As such, a gel product including (4) metal salt is obtained, which is the gel electrolyte. Since the heating step is performed at a low temperature (40° C. to 60° C.) for a short period of time (0.5 hour to 1.5 hours), other components of the battery will not be damaged.

In one embodiment, an active material of the positive electrode can be element sulfur, organic sulfides, sulfur carbon composite, lithium oxide of aluminum, vanadium, titanium, chromium, copper, molybdenum, niobium, iron, nickel, cobalt and manganese, lithium sulfides, lithium selenides, lithium tellurides, lithium phosphides, lithium silicides, lithium aluminum compounds, lithium boride, or a combination thereof. In one embodiment, an active material of the negative electrode can be lithium, lithium alloy, mesocarbon microbead (MCMB), vapor grown carbon fiber (VGCF), carbon nanotube (CNT), graphene, hard coke, graphite, carbon black, acetylene black, carbon fibers, glassy carbon, lithium titanium oxide, silicon, silicon-based alloy, tin, tin-based alloy, or a combination thereof.

In one embodiment, the electrolyte is put into a glass container. A probe of a viscometer (BROOKFIELD LVD-VII+) is put into the electrolyte and rotated. When a torque value of the rotated probe is stable at 45% to 80%, the viscosity of the electrolyte can be read out. The gel electrolyte should have a viscosity of greater than or equal to 200 cp at 25° C., which is measured by the above method. An electrolyte with an overly low viscosity will be liquid rather than gel. On the other hand, the conductivity of the electrolyte is analyzed by an AC impedance analyzer (Bio-Logic SAS SP-300), which should be greater than or equal to 10 mS/cm. Compared to a general liquid electrolyte, an electrolyte with an overly low conductivity will dramatically degrade the electrical properties and lifetime of the battery. A battery utilizing the gel electrolyte with appropriate viscosity and conductivity may have excellent electrical properties and be very safe.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

In the following Examples, BMI-PEG400 and BMI-PEG4K were synthesized according to U.S. Pat. No. 8,258,324 B2.

Example 1

A maleimide compound (BMI1100, commercially available from DAIWAKASEI Industry Co., Ltd.) was dissolved in a co-solvent of ethylene carbonate/propylene carbonate (EC/PC, v/v=3/2) to form a solution. The BMI1100 solution was heated to 130° C., and 2,4-dimethyl-2-imidazoline (D242, commercially available from Tsio Technologies Co., Ltd.) was slowly and dropwise added into the BMI1100 solution. After D242 was completely added into the BMI1100 solution, the mixture was reacted at 130° C. for 8 hours to obtain a meta-stable nitrogen-containing polymer a1. D242 and BMI1100 had a weight ratio of 1:2. Total weight of D242 and BMI1100 and total weight of EC/PC had a weight ratio of 3:100. BMI1100 has a chemical formula of:

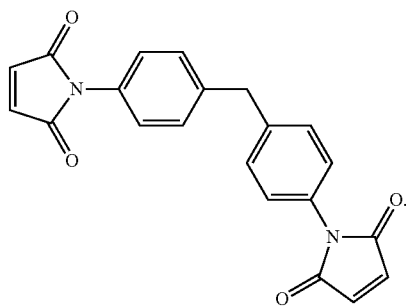 [SMILES: O=C1C=CC(=O)N1c1ccc(Cc2ccc(N3C(=O)C=CC3=O)cc2)cc1]

D242 has a chemical formula of:

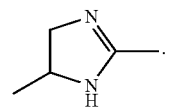

The meta-stable nitrogen-containing polymer a1 was put into a glass container, and a probe of a viscometer (BROOKFIELD LVDVII+) was put into the electrolyte and rotated. When a torque value of the rotated probe was stable at 45% to 80%, the viscosity of the meta-stable nitrogen-containing polymer a1 was read out (2 cp to 25 cp at 25° C.). The meta-stable nitrogen-containing polymer a1 was analyzed by a gel permeation chromatograms (GPC) to measure its peak time (24.42 mins and 24.45 mins).

Example 2

BMI1100 was dissolved in PC to form a solution. The BMI1100 solution was then heated to 130° C., and D242 was slowly and dropwise added into the BMI1100 solution. After D242 was completely added into the BMI1100 solution, the mixture was reacted at 130° C. for 8 hours to obtain a meta-stable nitrogen-containing polymer a2. D242 and BMI1100 had a weight ratio of 1:2. Total weight of D242 and BMI1100 and weight of PC had a weight ratio of 3:100.

The meta-stable nitrogen-containing polymer a2 had a viscosity of 2 cp to 25 cp at 25° C. and a GPC peak time of 24.80 mins, which were measured by methods similar to those in Example 1.

Example 3

A maleimide compound (BMI2300, commercially available from DAIWAKASEI Industry Co., Ltd.) was dissolved in a co-solvent of EC/PC (v/v=3/2) to form a solution. The BMI2300 solution was heated to 130° C., and D242 was slowly and dropwise added into the BMI2300 solution. After D242 was completely added into the BMI1100 solution, the mixture was reacted at 130° C. for 8 hours to obtain a meta-stable nitrogen-containing polymer a3. D242 and BMI2300 had a weight ratio of 1:2. Total weight of D242 and BMI2300 and total weight of EC/PC had a weight ratio of 3:100. BMI2300 has a chemical formula of:

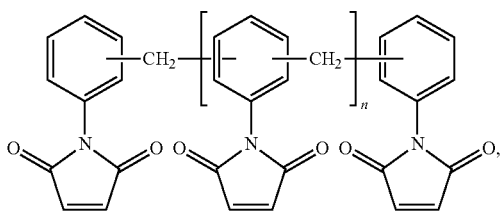

in which n is 0 to 4.

The meta-stable nitrogen-containing polymer a3 had a viscosity of 2 cp to 25 cp at 25° C. and a GPC peak time of 24.25 mins, which were measured by methods similar to those in Example 1.

Example 4

BMI2300 was dissolved in PC to form a solution. The BMI2300 solution was then heated to 130° C., and D242 was slowly and dropwise added into the BMI2300 solution. After D242 was completely added into the BMI2300 solution, the mixture was reacted at 130° C. for 8 hours to obtain a meta-stable nitrogen-containing polymer a4. D242 and BMI2300 had a weight ratio of 1:2. Total weight of D242 and BMI2300 and weight of PC had a weight ratio of 3:100.

The meta-stable nitrogen-containing polymer a4 had a viscosity of 2 cp to 25 cp at 25° C. and a GPC peak time of 24.10 mins, which were measured by methods similar to those in Example 1.

Example 5

A maleimide compound (BMI-PEG400) was dissolved in a co-solvent of EC/PC (v/v=3/2) to form a solution. The BMI-PEG400 solution was heated to 130° C., and D242 was slowly and dropwise added into the BMI-PEG400 solution. After D242 was completely added into the BMI-PEG400 solution, the mixture was reacted at 130° C. for 8 hours to obtain a meta-stable nitrogen-containing polymer a5. D242 and BMI-PEG400 had a weight ratio of 1:2. Total weight of D242 and BMI-PEG400 and total weight of EC/PC had a weight ratio of 3:100. BMI-PEG400 has a chemical formula of:

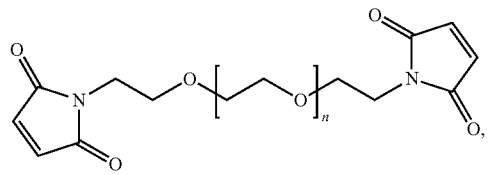

in which n is 7 to 8.

The meta-stable nitrogen-containing polymer a5 had a viscosity of 2 cp to 25 cp at 25° C. and a GPC peak time of 25.03 mins, which were measured by methods similar to those in Example 1.

Example 6

BMI-PEG400 was dissolved in PC to form a solution. The BMI-PEG400 solution was then heated to 130° C., and D242 was slowly and dropwise added into the BMI-PEG400 solution. After D242 was completely added into the BMI-PEG400 solution, the mixture was reacted at 130° C. for 8 hours to obtain a meta-stable nitrogen-containing polymer a6. D242 and BMI-PEG400 had a weight ratio of 1:2. Total weight of D242 and BMI-PEG400 and weight of PC had a weight ratio of 3:100.

The meta-stable nitrogen-containing polymer a6 had a viscosity of 2 cp to 25 cp at 25° C. and a GPC peak time of 25.46 mins, which were measured by methods similar to those in Example 1.

Example 7

A maleimide compound (BMI-PEG4K) was dissolved in a co-solvent of EC/PC (v/v=3/2) to form a solution. The BMI-PEG4K solution was heated to 130° C., and D242 was slowly and dropwise added into the BMI-PEG4K solution. After D242 was completely added into the BMI-PEG4K solution, the mixture was reacted at 130° C. for 8 hours to obtain a meta-stable nitrogen-containing polymer a7. D242 and BMI-PEG4K had a weight ratio of 1:2. Total weight of D242 and BMI-PEG4K and total weight of EC/PC had a weight ratio of 3:100. BMI-PEG4K has a chemical formula of:

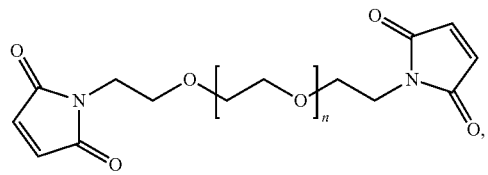

in which n is 88 to 90.

The meta-stable nitrogen-containing polymer a7 had a viscosity of 2 cp to 25 cp at 25° C. and a GPC peak time of 26.81 mins, which were measured by methods similar to those in Example 1.

Example 8

BMI-PEG4K was dissolved in PC to form a solution. The BMI-PEG4K solution was then heated to 130° C., and D242 was slowly and dropwise added into the BMI-PEG4K solution. After D242 was completely added into the BMI-PEG4K solution, the mixture was reacted at 130° C. for 8 hours to obtain a meta-stable nitrogen-containing polymer a8. D242 and BMI-PEG4K had a weight ratio of 1:2. Total weight of D242 and BMI-PEG4K and weight of PC had a weight ratio of 3:100.

The meta-stable nitrogen-containing polymer a8 had a viscosity of 2 cp to 25 cp at 25° C. and a GPC peak time of 27.15 mins, which were measured by methods similar to those in Example 1.

As shown in Table 1, the meta-stable nitrogen-containing polymers a1 to a8 had low viscosities (2 cp to 25 cp at 25° C.) to be liquid. Even if a lithium salt is added into the meta-stable nitrogen-containing polymers a1 to a8 to serve as electrolytes, these electrolytes will be liquid rather than gel electrolytes.

TABLE 1

| | Reactants (a/b, weight ratio) | Solvent (v/v) | a + b (wt %) | GPC peak time (mins) | Viscosity |
|---|---|---|---|---|---|
| a1 | D242/BMI1100 = 1/2 | EC/PC 3/2 | 3 | 24.42, 24.45 | 2 cp~25 cp |
| a2 | D242/BMI1100 = 1/2 | PC 1 | 3 | 24.80 | 2 cp~25 cp |
| a3 | D242/BMI2300 = 1/2 | EC/PC 3/2 | 3 | 24.25 | 2 cp~25 cp |
| a4 | D242/BMI2300 = 1/2 | PC 1 | 3 | 24.10 | 2 cp~25 cp |
| a5 | D242/BMI-PEG400 = 1/2 | EC/PC 3/2 | 3 | 25.03 | 2 cp~25 cp |
| a6 | D242/BMI-PEG400 = 1/2 | PC 1 | 3 | 25.46 | 2 cp~25 cp |
| a7 | D242/BMI-PEG4K = 1/2 | EC/PC 3/2 | 3 | 26.81 | 2 cp~25 cp |
| a8 | D242/BMI-PEG4K = 1/2 | PC 1 | 3 | 27.15 | 2 cp~25 cp |

Example 9

Diethyl carbonate (DEC) was mixed with lithium salt $LiPF_6$ to form a $LiPF_6$ solution. The $LiPF_6$ solution was dropwise added into the meta-stable nitrogen-containing polymer a1 of Example 1 to form a mixture. The meta-stable nitrogen-containing polymer a1 and DEC had a weight ratio of 1:1. In this Example, no further gelling promoter was added. The mixture was put into an oven, and heated to 50° C. and reacted at 50° C. for 1 hour for obtaining an electrolyte a1-0. The electrolyte a1-0 had a $LiPF_6$ concentration of 1.1 M. The electrolyte a1-0 was put into a glass container, and a probe of a viscometer (BROOKFIELD LVDVII+) was put into the electrolyte a1-0 and rotated. When a torque value of the rotated probe was stable at 45% to 80%, the viscosity of the electrolyte a1-0 was read out (25 cp to 200 cp at 25° C.). The meta-stable nitrogen-containing polymer a1 was analyzed by an AC impedance analyzer (Bio-Logic SAS SP-300) to measure its conductivity (11.97 mS/cm). The electrolyte a1-0 was a liquid due to its low viscosity.

Example 10

DEC was mixed with lithium salt $LiPF_6$ to form a $LiPF_6$ solution. The $LiPF_6$ solution was dropwise added into the meta-stable nitrogen-containing polymer a1 of Example 1 to form a mixture. The meta-stable nitrogen-containing polymer a1 and DEC had a weight ratio of 1:1. D242, serving as the gelling promoter, was added to the mixture, which was then put into an oven, and heated to 50° C. and reacted at 50° C. for 1 hour to obtain an electrolyte a1-1. The meta-stable nitrogen-containing polymer a1 and the gelling promoter D242 had a weight ratio of 1:1.76. The electrolyte a1-1 had a $LiPF_6$ concentration of 1.1 M. The electrolyte a1-1 had a viscosity of 200 cp to 1000 cp at 25° C. and a conductivity of 11.96 mS/cm, which were measured by methods similar to those in Example 9.

Example 11

DEC was mixed with lithium salt $LiPF_6$ to form a $LiPF_6$ solution. The $LiPF_6$ solution was dropwise added into the meta-stable nitrogen-containing polymer a1 of Example 1 to form a mixture. The meta-stable nitrogen-containing polymer a1 and DEC had a weight ratio of 10:1. D242, serving as the gelling promoter, was added to the mixture, which was then put into an oven, and heated to 50° C. and reacted at 50° C. for 1 hour to obtain an electrolyte a1-2. The meta-stable nitrogen-containing polymer a1 and the gelling promoter D242 had a weight ratio of 1:1.23. The electrolyte a1-2 had a $LiPF_6$ concentration of 1.1 M. The electrolyte a1-2 had a viscosity of greater than 1000 cp at 25° C. and a conductivity of 12.40 mS/cm, which were measured by methods similar to those in Example 9.

Example 12

DEC was mixed with lithium salt $LiPF_6$ to form a $LiPF_6$ solution. The $LiPF_6$ solution was dropwise added into the meta-stable nitrogen-containing polymer a1 of Example 1 to form a mixture. The meta-stable nitrogen-containing polymer a1 and DEC had a weight ratio of 1:10. D242, serving as the gelling promoter, was added to the mixture, which was then put into an oven, and heated to 50° C. and reacted at 50° C. for 1 hour to obtain an electrolyte a1-3. The meta-stable nitrogen-containing polymer a1 and the gelling promoter D242 had a weight ratio of 1:9.77. The electrolyte a1-3 had a $LiPF_6$ concentration of 1.1 M. The electrolyte a1-3 had a viscosity of 25 cp to 200 cp at 25° C. and a conductivity of 7.69 mS/cm, which were measured by methods similar to those in Example 9. The electrolyte a1-3 was a liquid due to its low viscosity.

Example 13

Dimethyl carbonate (DMC) was mixed with lithium salt $LiPF_6$ to form a $LiPF_6$ solution. The $LiPF_6$ solution was dropwise added into the meta-stable nitrogen-containing polymer a1 of Example 1 to form a mixture. The meta-stable nitrogen-containing polymer a1 and DMC had a weight ratio of 10:1. D242, serving as the gelling promoter, was added to the mixture, which was then put into an oven, and reacted at 50° C. for 1 hour to obtain an electrolyte a1-4. The meta-stable nitrogen-containing polymer a1 and the gelling promoter D242 had a weight ratio of 1:1.24. The electrolyte a1-4 had a LiPF$_6$ concentration of 1.1 M. The electrolyte a1-4 had a viscosity of 200 cp to 1000 cp at 25° C. and a conductivity of 12.29 mS/cm, which were measured by methods similar to those in Example 9.

Example 14

DMC was mixed with lithium salt LiPF$_6$ to form a LiPF$_6$ solution. The LiPF$_6$ solution was dropwise added into the meta-stable nitrogen-containing polymer a1 of Example 1 to form a mixture. The meta-stable nitrogen-containing polymer a1 and DMC had a weight ratio of 1:10. D242, serving as the gelling promoter, was added to the mixture, which was then put into an oven, and heated to 50° C. and reacted at 50° C. for 1 hour to obtain an electrolyte a1-5. The meta-stable nitrogen-containing polymer a1 and the gelling promoter D242 had a weight ratio of 1:10.6. The electrolyte a1-5 had a LiPF$_6$ concentration of 1.1 M. The electrolyte a1-5 had a viscosity of 25 cp to 200 cp at 25° C. and a conductivity of 14.53 mS/cm, which were measured by methods similar to those in Example 9. The electrolyte a1-5 was a liquid due to its low viscosity.

Example 15

DEC was mixed with lithium salt LiPF$_6$ to form a LiPF$_6$ solution. The LiPF$_6$ solution was dropwise added into the meta-stable nitrogen-containing polymer a1 of Example 1 to form a mixture. The meta-stable nitrogen-containing polymer a1 and DEC had a weight ratio of 1:1. D242, serving as the gelling promoter, was added to the mixture, which was then put into an oven, and heated to 50° C. and reacted at 50° C. for 1 hour to obtain an electrolyte a1-6. The meta-stable nitrogen-containing polymer a1 and the gelling promoter D242 had a weight ratio of 1:2.9. The electrolyte a1-6 had a LiPF$_6$ concentration of 1.1 M. The electrolyte a1-6 had a viscosity of 200 cp to 1000 cp at 25° C. and a conductivity of 11.79 mS/cm, which were measured by methods similar to those in Example 9.

Example 16

DEC was mixed with lithium salt LiPF$_6$ to form a LiPF$_6$ solution. The LiPF$_6$ solution was dropwise added into the meta-stable nitrogen-containing polymer a1 of Example 1 to form a mixture. The meta-stable nitrogen-containing polymer a1 and DEC had a weight ratio of 1:1. D242, serving as the gelling promoter, was added to the mixture, which was then put into an oven, and heated to 50° C. and reacted at 50° C. for 1 hour to obtain an electrolyte a1-7. The meta-stable nitrogen-containing polymer a1 and the gelling promoter D242 had a weight ratio of 1:5.81. The electrolyte a1-7 had a LiPF$_6$ concentration of 1.1 M. The electrolyte a1-7 had a viscosity of 200 cp to 1000 cp at 25° C. and a conductivity of 10.08 mS/cm, which were measured by methods similar to those in Example 9.

Example 17

DEC was mixed with lithium salt LiPF$_6$ to form a LiPF$_6$ solution. The LiPF$_6$ solution was dropwise added into the meta-stable nitrogen-containing polymer a1 of Example 1 to form a mixture. The meta-stable nitrogen-containing polymer a1 and DEC had a weight ratio of 1:1. Methyl methacrylate (MMA), serving as the gelling promoter, was added to the mixture, which was then put into an oven, and heated to 50° C. and reacted at 50° C. for 1 hour to obtain an electrolyte a1-8. The meta-stable nitrogen-containing polymer a1 and the gelling promoter MMA had a weight ratio of 1:2.09. The electrolyte a1-8 had a LiPF$_6$ concentration of 1.1 M. The electrolyte a1-8 had a viscosity of 200 cp to 1000 cp at 25° C. and a conductivity of 13.44 mS/cm, which were measured by methods similar to those in Example 9.

Example 18

DEC was mixed with lithium salt LiPF$_6$ to form a LiPF$_6$ solution. The LiPF$_6$ solution was dropwise added into the meta-stable nitrogen-containing polymer a1 of Example 1 to form a mixture. The meta-stable nitrogen-containing polymer a1 and DEC had a weight ratio of 1:1. Poly(ethylene glycol) methyl ether acrylate (PEG-A, CAS #32171-39-4), serving as the gelling promoter, was added to the mixture, which was then put into an oven, and heated to 50° C. and reacted at 50° C. for 1 hour to obtain an electrolyte a1-9. The meta-stable nitrogen-containing polymer a1 and the gelling promoter PEG-A had a weight ratio of 1:2.1. The electrolyte a1-9 had a LiPF$_6$ concentration of 1.1 M. The electrolyte a1-9 had a viscosity of 200 cp to 1000 cp at 25° C. and a conductivity of 12.86 mS/cm, which were measured by methods similar to those in Example 9.

Example 19

DEC was mixed with lithium salt LiPF$_6$ to form a LiPF$_6$ solution. The LiPF$_6$ solution was dropwise added into the meta-stable nitrogen-containing polymer a1 of Example 1 to form a mixture. The meta-stable nitrogen-containing polymer a1 and DEC had a weight ratio of 1:1. D242 and BMI1100 (w/w=1/10), serving as the gelling promoter, were added to the mixture, which was then put into an oven, and heated to 50° C. and reacted at 50° C. for 1 hour to obtain an electrolyte a1-10. The meta-stable nitrogen-containing polymer a1 and the gelling promoter D242 and BMI1100 had a weight ratio of 1:1.78. The electrolyte a1-10 had a LiPF$_6$ concentration of 1.1 M. The electrolyte a1-10 had a viscosity of 200 cp to 1000 cp at 25° C. and a conductivity of 11.32 mS/cm, which were measured by methods similar to those in Example 9.

Example 20

DEC was mixed with lithium salt LiPF$_6$ to form a LiPF$_6$ solution. The LiPF$_6$ solution was dropwise added into the meta-stable nitrogen-containing polymer a1 of Example 1 to form a mixture. The meta-stable nitrogen-containing polymer a1 and DEC had a weight ratio of 1:1. Bis(4-tert-butylcyclohexyl) peroxydicarbonate (BCHPC, CAS #15520-11-3) and MMA (w/w=1/10), serving as the gelling promoter, were added to the mixture, which was then put into an oven, and heated to 50° C. and reacted at 50° C. for 1 hour to obtain an electrolyte a1-11. The meta-stable nitrogen-containing polymer a1 and the gelling promoter BCHPC and MMA had a weight ratio of 1:1.74. The electrolyte a1-11 had a LiPF$_6$ concentration of 1.1 M. The electrolyte a1-11 had a viscosity of 200 cp to 1000 cp at 25° C. and a conductivity of 10.37 mS/cm, which were measured by methods similar to those in Example 9.

Example 21

DEC was mixed with lithium salt LiPF$_6$ to form a LiPF$_6$ solution. The LiPF$_6$ solution was dropwise added into the meta-stable nitrogen-containing polymer a1 of Example 1 to form a mixture. The meta-stable nitrogen-containing polymer a1 and DEC had a weight ratio of 1:1. BCHPC and PEG-A (w/w=1/10), serving as the gelling promoter, were added to the mixture, which was then put into an oven, and heated to 50° C. and reacted at 50° C. for 1 hour to obtain an electrolyte a1-12. The meta-stable nitrogen-containing polymer a1 and the gelling promoter BCHPC and PEG-A had a weight ratio of 1:1.76. The electrolyte a1-12 had a LiPF$_6$ concentration of 1.1 M. The electrolyte a1-12 had a viscosity of 200 cp to 1000 cp at 25° C. and a conductivity of 12.17 mS/cm, which were measured by methods similar to those in Example 9.

viscosity of greater than 1000 cp at 25° C. and a conductivity of 12.64 mS/cm, which were measured by methods similar to those in Example 9.

Example 24

DEC was mixed with lithium salt LiPF$_6$ to form a LiPF$_6$ solution. The LiPF$_6$ solution was dropwise added into the meta-stable nitrogen-containing polymer a4 of Example 4 to form a mixture. The meta-stable nitrogen-containing polymer a4 and DEC had a weight ratio of 1:1. D242, serving as the gelling promoter, was added to the mixture, which was then put into an oven, and heated to 50° C. and reacted at 50° C. for 1 hour to obtain an electrolyte a4-1. The meta-stable nitrogen-containing polymer a4 and the gelling promoter D242 had a weight ratio of 1:1.79. The electrolyte a4-1 had a LiPF$_6$ concentration of 1.1 M. The electrolyte a4-1 had a viscosity of greater than 1000 cp at 25° C. and a conductivity of 12.06 mS/cm, which were measured by methods similar to those in Example 9.

TABLE 2

| | Meta-stable nitrogen-containing polymer (1) | Carbonate (3) | (1):(3) | Gelling promoter (2) | (1):(2) | Lithium salt (4) | Viscosity (cp) | Conductivity (mS/cm) |
|---|---|---|---|---|---|---|---|---|
| a1-0 | a1 | DEC | 1:1 | — | — | LiPF$_6$ | 25-200 | 11.97 |
| a1-1 | a1 | DEC | 1:1 | D242 | 1:1.76 | LiPF$_6$ | 200-1000 | 11.96 |
| a1-2 | a1 | DEC | 10:1 | D242 | 1:1.23 | LiPF$_6$ | >1000 | 12.40 |
| a1-3 | a1 | DEC | 1:10 | D242 | 1:9.77 | LiPF$_6$ | 25-200 | 7.69 |
| a1-4 | a1 | DMC | 10:1 | D242 | 1:1.24 | LiPF$_6$ | 200-1000 | 12.29 |
| a1-5 | a1 | DMC | 1:10 | D242 | 1:10.6 | LiPF$_6$ | 25-200 | 14.53 |
| a1-6 | a1 | DEC | 1:1 | D242 | 1:2.9 | LiPF$_6$ | 200-1000 | 11.79 |
| a1-7 | a1 | DEC | 1:1 | D242 | 1:5.81 | LiPF$_6$ | 200-1000 | 10.08 |
| a1-8 | a1 | DEC | 1:1 | MMA | 1:2.09 | LiPF$_6$ | 200-1000 | 13.44 |
| a1-9 | a1 | DEC | 1:1 | PEG-A | 1:2.1 | LiPF$_6$ | 200-1000 | 12.86 |
| a1-10 | a1 | DEC | 1:1 | D242:BMI1100 (1:10) | 1:1.78 | LiPF$_6$ | 200-1000 | 11.32 |
| a1-11 | a1 | DEC | 1:1 | BCHPC:MMA (1:10) | 1:1.74 | LiPF$_6$ | 200-1000 | 10.37 |
| a1-12 | a1 | DEC | 1:1 | BCHPC:PEG-A (1:10) | 1:1.76 | LiPF6 | 200-1000 | 12.17 |

Example 22

DEC was mixed with lithium salt LiPF$_6$ to form a LiPF$_6$ solution. The LiPF$_6$ solution was dropwise added into the meta-stable nitrogen-containing polymer a2 of Example 2 to form a mixture. The meta-stable nitrogen-containing polymer a2 and DEC had a weight ratio of 1:1. D242, serving as the gelling promoter, was added to the mixture, which was then put into an oven, and heated to 50° C. and reacted at 50° C. for 1 hour to obtain an electrolyte a2-1. The meta-stable nitrogen-containing polymer a2 and the gelling promoter D242 had a weight ratio of 1:1.81. The electrolyte a2-1 had a LiPF$_6$ concentration of 1.1 M. The electrolyte a2-1 had a viscosity of 200 cp to 1000 cp at 25° C. and a conductivity of 11.18 mS/cm, which were measured by methods similar to those in Example 9.

Example 23

DEC was mixed with lithium salt LiPF$_6$ to form a LiPF$_6$ solution. The LiPF$_6$ solution was dropwise added into the meta-stable nitrogen-containing polymer a3 of Example 3 to form a mixture. The meta-stable nitrogen-containing polymer a3 and DEC had a weight ratio of 1:1. D242, serving as the gelling promoter, was added to the mixture, which was then put into an oven, and heated to 50° C. and reacted at 50° C. for 1 hour to obtain an electrolyte a3-1. The meta-stable nitrogen-containing polymer a3 and the gelling promoter D242 had a weight ratio of 1:1.74. The electrolyte a3-1 had a LiPF$_6$ concentration of 1.1 M. The electrolyte a3-1 had a

Example 25

DEC was mixed with lithium salt LiPF$_6$ to form a LiPF$_6$ solution. The LiPF$_6$ solution was dropwise added into the meta-stable nitrogen-containing polymer a5 of Example 5 to form a mixture. The meta-stable nitrogen-containing polymer a5 and DEC had a weight ratio of 1:1. D242, serving as the gelling promoter, was added to the mixture, which was then put into an oven, and heated to 50° C. and reacted at 50° C. for 1 hour to obtain an electrolyte a5-1. The meta-stable nitrogen-containing polymer a5 and the gelling promoter D242 had a weight ratio of 1:1.75. The electrolyte a5-1 had a LiPF$_6$ concentration of 1.1 M. The electrolyte a5-1 had a viscosity of 200 cp to 1000 cp at 25° C. and a conductivity of 12.47 mS/cm, which were measured by methods similar to those in Example 9.

Example 26

DEC was mixed with lithium salt LiPF$_6$ to form a LiPF$_6$ solution. The LiPF$_6$ solution was dropwise added into the meta-stable nitrogen-containing polymer a6 of Example 6 to form a mixture. The meta-stable nitrogen-containing polymer a6 and DEC had a weight ratio of 1:1. D242, serving as the gelling promoter, was added to the mixture, which was then put into an oven, and heated to 50° C. and reacted at 50° C. for 1 hour to obtain an electrolyte a6-1. The meta-stable nitrogen-containing polymer a5 and the gelling promoter D242 had a weight ratio of 1:1.78. The electrolyte a6-1 had a $LiPF_6$ concentration of 1.1 M. The electrolyte a6-1 had a viscosity of 200 cp to 1000 cp at 25° C. and a conductivity of 12.39 mS/cm, which were measured by methods similar to those in Example 9.

Example 27

DEC was mixed with lithium salt $LiPF_6$ to form a $LiPF_6$ solution. The $LiPF_6$ solution was dropwise added into the meta-stable nitrogen-containing polymer a7 of Example 7 to form a mixture. The meta-stable nitrogen-containing polymer a7 and DEC had a weight ratio of 1:1. D242, serving as the gelling promoter, was added to the mixture, which was then put into an oven, and heated to 50° C. and reacted at 50° C. for 1 hour to obtain an electrolyte a7-1. The meta-stable nitrogen-containing polymer a7 and the gelling promoter D242 had a weight ratio of 1:1.73. The electrolyte a7-1 had a $LiPF_6$ concentration of 1.1 M. The electrolyte a7-1 had a viscosity of 200 cp to 1000 cp at 25° C. and a conductivity of 13.46 mS/cm, which were measured by methods similar to those in Example 9.

Example 28

DEC was mixed with lithium salt $LiPF_6$ to form a $LiPF_6$ solution. The $LiPF_6$ solution was dropwise added into the meta-stable nitrogen-containing polymer a8 of Example 8 to form a mixture. The meta-stable nitrogen-containing polymer a8 and DEC had a weight ratio of 1:1. D242, serving as the gelling promoter, was added to the mixture, which was then put into an oven, and heated to 50° C. and reacted at 50° C. for 1 hour to obtain an electrolyte a8-1. The meta-stable nitrogen-containing polymer a8 and the gelling promoter D242 had a weight ratio of 1:1.78. The electrolyte a8-1 had a $LiPF_6$ concentration of 1.1 M. The electrolyte a8-1 had a viscosity of 200 cp to 1000 cp at 25° C. and a conductivity of 11.50 mS/cm, which were measured by methods similar to those in Example 9.

TABLE 3

| | Meta-stable nitrogen-containing polymer (1) | Carbonate (3) | (1):(3) | Gelling promoter (2) | (1):(2) | Lithium salt (4) | Viscosity (cp) | Conductivity (mS/cm) |
|---|---|---|---|---|---|---|---|---|
| a2-1 | a2 | DEC | 1:1 | D242 | 1:1.81 | $LiPF_6$ | 200-1000 | 11.18 |
| a3-1 | a3 | DEC | 1:1 | D242 | 1:1.74 | $LiPF_6$ | >1000 | 12.64 |
| a4-1 | a4 | DEC | 1:1 | D242 | 1:1.79 | $LiPF_6$ | >1000 | 12.06 |
| a5-1 | a5 | DEC | 1:1 | D242 | 1:1.75 | $LiPF_6$ | 200-1000 | 12.47 |
| a6-1 | a6 | DEC | 1:1 | D242 | 1:1.78 | $LiPF_6$ | 200-1000 | 12.39 |
| a7-1 | a7 | DEC | 1:1 | D242 | 1:1.73 | $LiPF_6$ | 200-1000 | 13.46 |
| a8-1 | a8 | DEC | 1:1 | D242 | 1:1.78 | $LiPF_6$ | 200-1000 | 11.50 |

Example 29

90 wt % of artificial Graphite MCMB (with a diameter of about 1 to 30 μm), about 5 wt % of conductive additive, and about 5 wt % of adhesive were dissolved in NMP and evenly stirred, and then coated on a copper foil roll with a size of 300 m×35 cm×12 μm by a blade with a fixed space, thereby obtaining a negative electrode roll. The negative electrode roll was then roll-pressed to form stripes, and then dried under vacuum at 110° C. for 4 hours to obtain negative electrode plates. 91.3 wt % of active material $LiCoO_2$, 5 wt % of binder PVDF-HFP, and 3.7 wt % of conductive carbon were mixed and dissolved in NMP to prepare a positive electrode slurry. The slurry was coated on aluminum foil with a thickness of about 15 μm by a blade with a fixed space, and then dried at 110° C. for about 8 hours and roll-pressed to obtain positive electrode plates with an electrode layer thickness of 60 μm. The positive electrode plate and the negative electrode plate were assembled to form a button cell battery CR2032.

DEC was mixed with lithium salt $LiPF_6$ to form a $LiPF_6$ solution. The $LiPF_6$ solution was dropwise added into the meta-stable nitrogen-containing polymer a1 of Example 1 to form a mixture. The meta-stable nitrogen-containing polymer a1 and DEC had a weight ratio of 1:1. D242, serving as the gelling promoter, was added to the mixture, which was then injected into the space between the positive and negative electrode plates in the button cell battery CR2032, and then heated to 50° C. and reacted at 50° C. for 1 hour to obtain the electrolyte a1-1. The charge-discharge properties of the battery were shown in Table 4. The battery was punctured by an iron nail, and only a instant spark occurred for 2 seconds. The punctured battery had a complete shape, and the puncturing point had a complete and clear section. Accordingly, the battery utilizing the gel electrolyte was very safe.

TABLE 4

| | (Gel electrolyte) | | | |
|---|---|---|---|---|
| $n^{th}$ charge-discharge cycle | Charge capacity (Ah) | Discharge capacity (Ah) | Retention rate (%) | C-rate |
| 1 | 0.0609 | 1.0728 | 100 | 0.2 C |
| 2 | 1.0617 | 1.0532 | 98 | 0.2 C |
| 3 | 1.0547 | 1.0453 | 97 | 0.5 C |
| 4 | 1.0462 | 1.0432 | 97 | 0.5 C |
| 5 | 1.0435 | 1.0321 | 96 | 1 C |
| 6 | 1.0309 | 1.0275 | 96 | 1 C |
| 7 | 1.0249 | 0.9930 | 93 | 2 C |
| 8 | 1.0015 | 1.0122 | 94 | 2 C |
| 9 | 1.0018 | 0.9822 | 92 | 3 C |
| 10 | 0.9805 | 0.9835 | 92 | 3 C |

TABLE 4-continued

| | (Gel electrolyte) | | | |
|---|---|---|---|---|
| $n^{th}$ charge-discharge cycle | Charge capacity (Ah) | Discharge capacity (Ah) | Retention rate (%) | C-rate |
| 11 | 0.9807 | 1.0359 | 97 | 0.2 C |
| 12 | 1.0425 | 1.0416 | 97 | 0.2 C |

Example 30

DEC was mixed with lithium salt LiPF$_6$ to form a LiPF$_6$ solution. The LiPF$_6$ solution was dropwise added into the meta-stable nitrogen-containing polymer a1 of Example 1 to form a mixture. The meta-stable nitrogen-containing polymer a1 and DEC had a weight ratio of 1:1. The mixture was then injected into the space between the positive and negative electrode plates in the button cell battery CR2032, and then heated to 50° C. and reacted at 50° C. for 1 hour to obtain the electrolyte a1-0. The charge-discharge properties of the battery were shown in Table 5. According to a comparison between Tables 4 and 5, the battery utilizing the gel electrolyte and the battery utilizing the liquid electrolyte had similar electrical properties (e.g. retention rate). The battery was punctured by an iron nail, and the battery was violently burned with continuous flame for 30 seconds. The punctured battery was seriously deformed due to the burst from the puncturing point. As such, the battery utilizing the liquid electrolyte a1-0 had a worse level of safety than that of the battery utilizing the gel electrolyte a1-1.

TABLE 5

(Liquid electrolyte)

| nth charge discharge cycle | Charge capacity (Ah) | Discharge capacity (Ah) | Retention rate (%) | C-rate |
|---|---|---|---|---|
| 1 | 0.0408 | 1.0718 | 100 | 0.2 C |
| 2 | 1.0582 | 1.0756 | 99 | 0.2 C |
| 3 | 1.0539 | 1.0463 | 98 | 0.5 C |
| 4 | 1.0413 | 1.0428 | 97 | 0.5 C |
| 5 | 1.0384 | 1.0319 | 96 | 1 C |
| 6 | 1.0280 | 1.0263 | 96 | 1 C |
| 7 | 1.0225 | 0.9990 | 93 | 2 C |
| 8 | 0.9998 | 1.0025 | 94 | 2 C |
| 9 | 0.9982 | 0.8789 | 82 | 3 C |
| 10 | 0.8764 | 0.8610 | 80 | 3 C |
| 11 | 0.8575 | 1.0367 | 97 | 0.2 C |
| 12 | 1.0325 | 1.0369 | 97 | 0.2 C |

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A precursor composition of a gel electrolyte, comprising:
   (1) meta-stable nitrogen-containing polymer, formed by reacting (a) nitrogen-containing heterocyclic compound with (b) maleimide compound, wherein (a) nitrogen-containing heterocyclic compound and (b) maleimide compound have a molar ratio of 1:0.1 to 1:10;
   (2) gelling promoter;
   (3) carbonate compound; and
   (4) metal salt, wherein (b) maleimide compound has a chemical formula of:

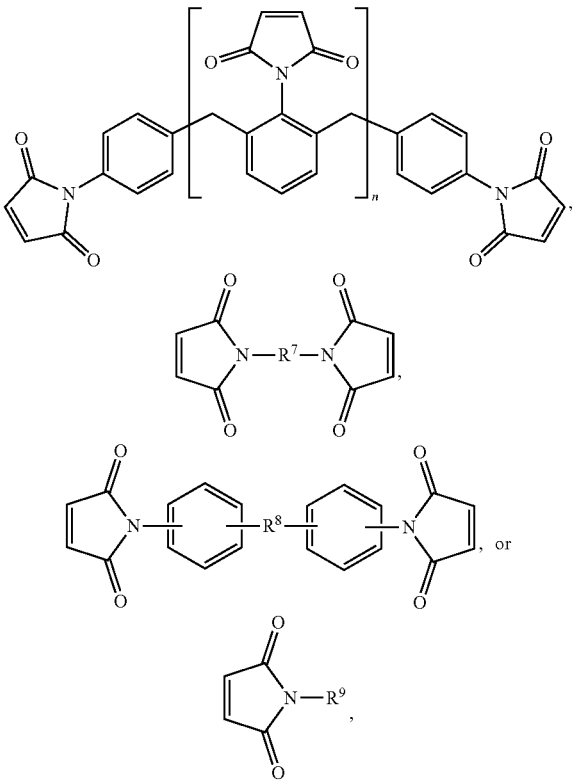

wherein n is an integer of 0 to 4;

R$^7$ is —R$^{10}$CH$_2$R$^{11}$—, —R$^{10}$NHR$^{10}$—, —C(O)CH$_2$—, —R$^{11}$OR$^{12}$OR$^{11}$—, —CH$_2$(OCH$_2$)$_m$—, —C(O)—, —O—, —O—O—, —S—, —S—S—, —S(O)—, —CH$_2$S(O)CH$_2$—, —(O)S(O)—, —C$_6$H$_4$—, —CH$_2$(C$_6$H$_4$)CH$_2$—, —CH$_2$(C$_6$H$_4$)(O)—, —C$_2$H$_4$—(NHC$_2$H$_4$)—C$_2$H$_4$—, siloxy group, biphenylene group, substituted phenylene group, or substituted biphenylene group, wherein m is an integer of 1 to 140, R$^{10}$ is C$_{1-4}$ alkylene group, R$^{11}$ is C$_{1-4}$ alkylene group, biphenylene group, substituted phenylene group, or substituted bisphenylene group, and R$^{12}$ is C$_{1-4}$ alkylene group, substituted phenylene group or —C$_6$H$_4$—(CCF$_3$)$_2$—C$_6$H$_4$—, biphenylene group, or substituted biphenylene group;

R$^8$ is —CH$_2$—, —R$^{13}$CH$_2$—, —CH$_2$—(O)—, —C(CH$_3$)$_2$—, —O—, —O—O—, —S—, —S—S—, —(O)S(O)—, —C(CF$_3$)$_2$—, or —S(O)—, and R$^{13}$ is C$_{1-4}$ alkylene group; and R$^9$ is hydrogen, C$_{1-4}$ alkyl group, phenyl group, benzyl group, cyclohexyl group, sulfo group, —C$_6$H$_4$CN, N-methoxycarbonyl, —C$_6$H$_4$—O(C$_2$H$_4$O)—CH$_3$, —C$_2$H$_4$—(C$_2$H$_4$O)$_{11}$—OCH$_3$, or —C(O)CH$_3$, wherein (2) gelling promoter has a chemical formula of:

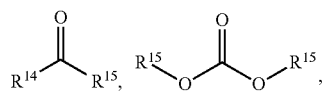

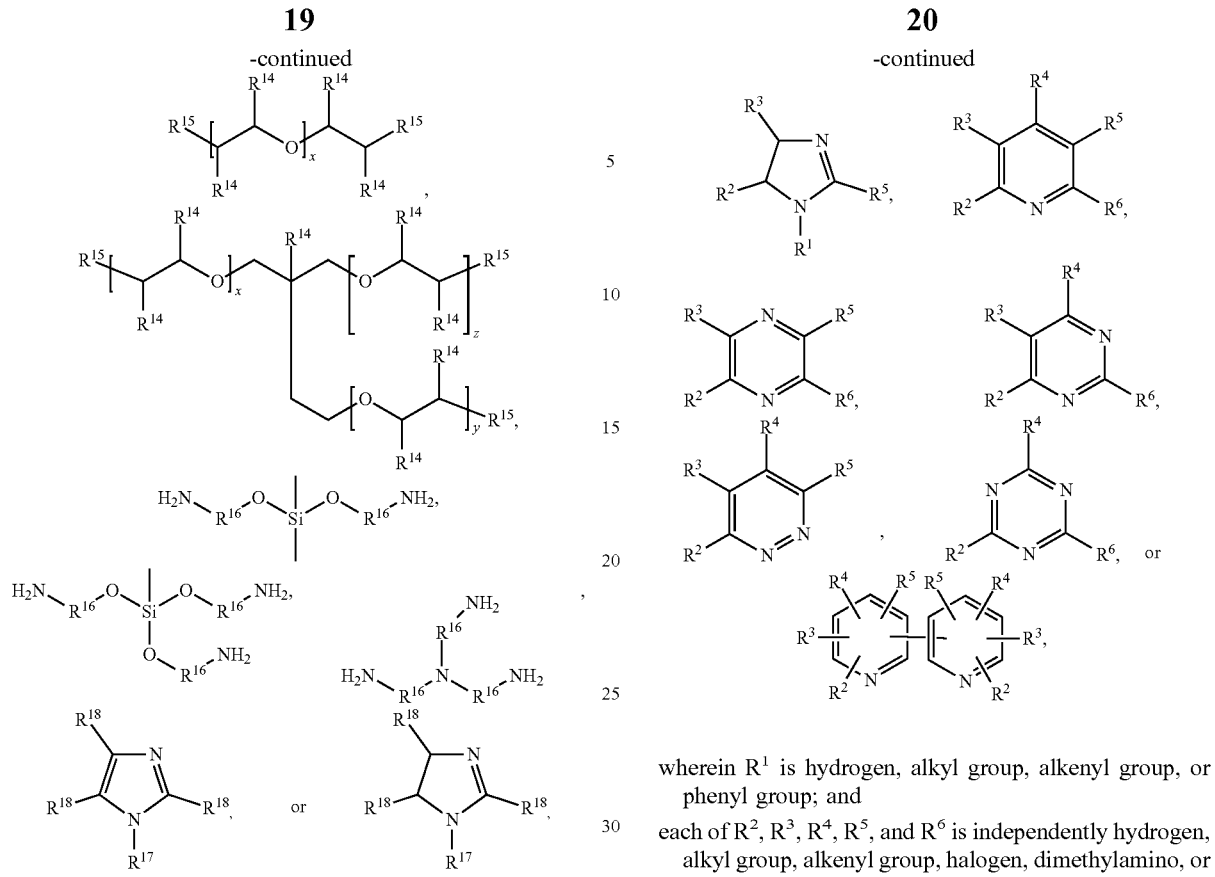

wherein each of R$^{14}$ is independently hydrogen, alkyl group, or alkoxy group;

each of R$^{15}$ is independently —NH$_2$, —NR$^{19}$H, acryl group, acrylate group, allyl group, or alkoxycarbonyl group, and R$^{19}$ is C$_{1-4}$ alkylene group;

each of R$^{16}$ is independently ethylene group, phenylene group, or olefin group;

R$^{17}$ is hydrogen, alkyl group, alkenyl group, or phenyl group;

each of R$^{18}$ is independently hydrogen, alkyl group, alkenyl group, phenyl group, dimethylamino group, halogen, or —NH$_2$; and each of x, v, and z is independently an integer of 0 to 10.

2. The precursor composition as claimed in claim 1, wherein (1) meta-stable nitrogen-containing polymer and (2) gelling promoter have a weight ratio of 1:1 to 1:9.

3. The precursor composition as claimed in claim 1, wherein (1) meta-stable nitrogen-containing polymer and (3) carbonate compound have a weight ratio of 1:0.1 to 1:1.

4. The precursor composition as claimed in claim 1, wherein a concentration of (4) metal salt in the precursor composition is 0.5M to 2M.

5. The precursor composition as claimed in claim 1, wherein (a) nitrogen-containing heterocyclic compound has a chemical formula of:

wherein R$^1$ is hydrogen, alkyl group, alkenyl group, or phenyl group; and each of R$^2$, R$^3$, R$^4$, R$^5$, and R$^6$ is independently hydrogen, alkyl group, alkenyl group, halogen, dimethylamino, or —NH$_2$.

6. The precursor composition as claimed in claim 1, wherein (a) nitrogen-containing heterocyclic compound is imidazole, pyrrole, pyridine, 4-tert-butylpyridine, 3-butylpyridine, 4-dimethylaminopyridine, 2,4,6-triamino-1,3,5-triazine, 2,4-dimethyl-2-imidazoline, pyridazine, pyrimidine, pyrazine, or a combination thereof.

7. The precursor composition as claimed in claim 1, wherein (3) carbonate compound has a chemical formula of:

wherein R$^{20}$ is alkyl group, alkoxy group, phenoxy group, or ester group;

R$^{21}$ is alkyl group, ester group, or phenyl group;

m is an integer of 1 to 5;

R$^{22}$ is oxygen or sulfur;

R$^{23}$ is alkylene group; and each of R$^{24}$ and R$^{25}$ are independently hydrogen, alkyl group, or halogen.

8. The precursor composition as claimed in claim 1, wherein the metal salt comprises LiPF$_6$, LiBF$_4$, LiAsF$_6$, LiSbF$_6$, LiClO$_4$, LiAlCl$_4$, LiGaCl$_4$, LiNO$_3$, LiC(SO$_2$CF$_3$)$_3$, LiN(SO$_2$CF$_3$)$_2$, LiSCN, LiO$_3$SCF$_2$CF$_3$, LiC$_6$F$_5$SO$_3$, LiO$_2$CCF$_3$, LiSO$_3$F, LiB(C$_6$H$_5$)$_4$, LiCF$_3$SO$_3$, or a combination thereof.

9. A gel electrolyte, comprising:
a product of a gelling reaction of (1) meta-stable nitrogen-containing polymer, (2) gelling promoter, and (3) carbonate compound; and
(4) metal salt,
wherein (1) meta-stable nitrogen-containing polymer is formed by reacting (a) nitrogen-containing heterocyclic compound and (b) maleimide compound, wherein (a) nitrogen-containing heterocyclic compound and (b) maleimide compound have a molar ratio of 1:0.1 to 1:10,
wherein (b) maleimide compound has a chemical formula of:

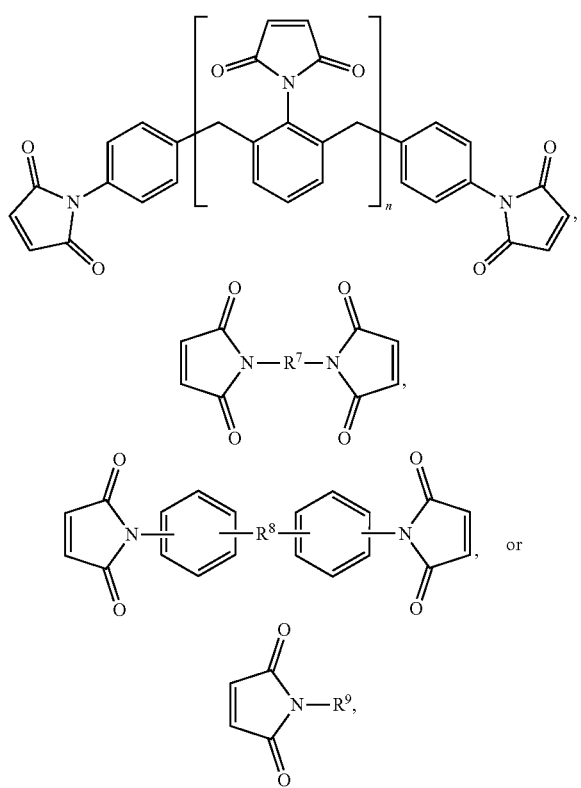

wherein n is an integer of 0 to 4;
$R^7$ is —$R^{10}CH_2R^{11}$—, —$R^{10}NHR^{10}$—, —C(O)CH$_2$—, —$R^{11}OR^{12}OR^{11}$—, —CH$_2$(OCH$_2$)$_m$—, —C(O)—, —O—, —O—O—, —S—, —S—S—, —S(O)—, —CH$_2$S(O)CH$_2$—, —(O)S(O)—, —C$_6$H$_4$—, —CH$_2$(C$_6$H$_4$)CH$_2$—, —CH$_2$(C$_6$H$_4$)(O)—, —C$_2$H$_4$—(NHC$_2$H$_4$)—C$_2$H$_4$—, siloxy group, biphenylene group, substituted phenylene group, or substituted biphenylene group, wherein m is an integer of 1 to 140, $R^{10}$ is C$_{1-4}$ alkylene group, $R^{11}$ is C$_{1-4}$ alkylene group, biphenylene group, substituted phenylene group, or substituted bisphenylene group, and $R^{12}$ is C$_{1-4}$ alkylene group, substituted phenylene group or —C$_6$H$_4$—(CCF$_3$)$_2$—C$_6$H$_4$—, biphenylene group, or substituted biphenylene group;
$R^8$ is —CH$_2$—, —$R^{13}$CH$_2$—, —CH$_2$—(O)—, —C(CH$_3$)$_2$—, —O—, —O—O—, —S—, —S—S—, —(O)S(O)—, —C(CF$_3$)$_2$—, or —S(O)—, and $R^{13}$ is C$_{1-4}$ alkylene group; and
$R^9$ is hydrogen, C$_{1-4}$ alkyl group, phenyl group, benzyl group, cyclohexyl group, sulfo group, —C$_6$H$_4$CN, N-methoxycarbonyl, —C$_6$H$_4$—O(C$_2$H$_4$O)—CH$_3$, —C$_2$H$_4$—(C$_2$H$_4$O)$_{11}$—OCH$_3$, or —C(O)CH$_3$,
wherein (2) gelling promoter has a chemical formula of:

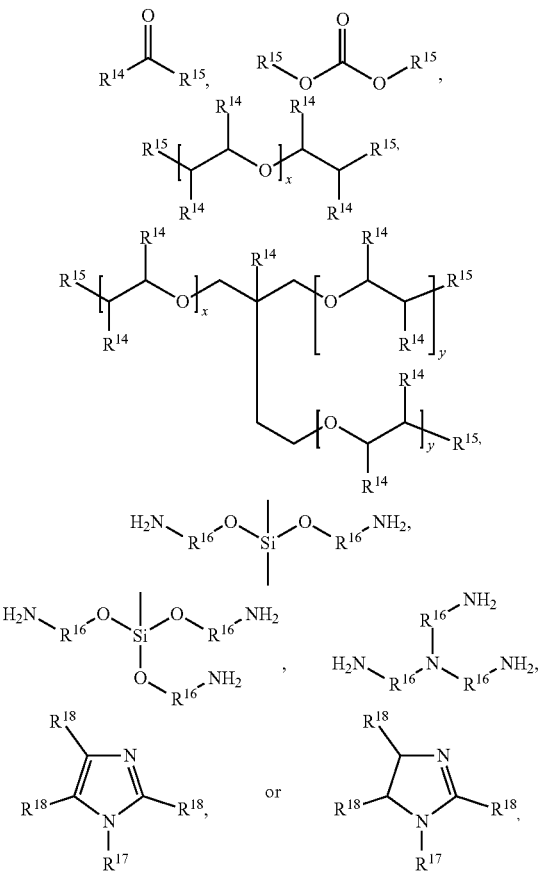

wherein each of $R^{14}$ is independently hydrogen, alkyl group, or alkoxy group;
each of $R^{15}$ is independently —NH$_2$, —NR$^{19}$H, acryl group, acrylate group, allyl group, or alkoxycarbonyl group, and $R^{19}$ is C$_{1-4}$ alkylene group;
each of $R^{16}$ is independently ethylene group, phenylene group, or olefin group;
$R^{17}$ is hydrogen, alkyl group, alkenyl group, or phenyl group;
each of $R^{18}$ is independently hydrogen, alkyl group, alkenyl group, phenyl group, dimethylamino group, halogen, or —NH$_2$; and
each of x, y, and z is independently an integer of 0 to 10.

10. The gel electrolyte as claimed in claim 9, wherein (1) meta-stable nitrogen-containing polymer and (2) gelling promoter have a weight ratio of 1:1 to 1:9.

11. The gel electrolyte as claimed in claim 9, wherein (1) meta-stable nitrogen-containing polymer and (3) carbonate compound have a weight ratio of 1:0.1 to 1:1.

12. The gel electrolyte as claimed in claim 9, wherein a concentration of (4) metal salt in the gel electrolyte is 0.5M to 2M.

13. The gel electrolyte as claimed in claim 9, wherein (a) nitrogen-containing heterocyclic compound has a chemical formula of:

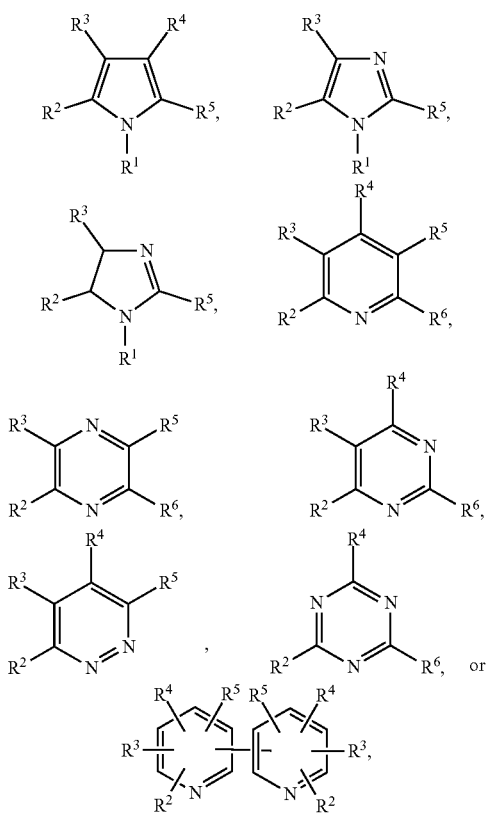

wherein R$^1$ is hydrogen, alkyl group, alkenyl group, or phenyl group; and
each of R$^2$, R$^3$, R$^4$, R$^5$, and R$^6$ is independently hydrogen, alkyl group, alkenyl group, halogen, dimethylamino, or —NH$_2$.

14. The gel electrolyte as claimed in claim 9, wherein (a) nitrogen-containing heterocyclic compound is imidazole, pyrrole, pyridine, 4-tert-butylpyridine, 3-butylpyridine, 4-dimethylaminopyridine, 2,4,6-triamino-1,3,5-triazine, 2,4-dimethyl-2-imidazoline, pyridazine, pyrimidine, pyrazine, or a combination thereof.

15. The gel electrolyte as claimed in claim 9, wherein (3) carbonate compound has a chemical formula of:

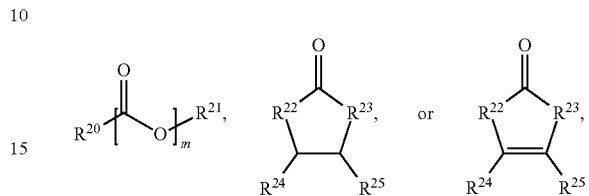

wherein R$^{20}$ is alkyl group, alkoxy group, phenoxy group, or ester group;
R$^{21}$ is alkyl group, ester group, or phenyl group;
m is 1 to 5;
R$^{22}$ is oxygen or sulfur;
R$^{23}$ is alkylene group; and
each of R$^{24}$ and R$^{25}$ are independently hydrogen, alkyl group, or halogen.

16. The gel electrolyte as claimed in claim 9, wherein the metal salt comprises LiPF$_6$, LiBF$_4$, LiAsF$_6$, LiSbF$_6$, LiClO$_4$, LiAlCl$_4$, LiGaCl$_4$, LiNO$_3$, LiC(SO$_2$CF$_3$)$_3$, LiN(SO$_2$CF$_3$)$_2$, LiSCN, LiO$_3$SCF$_2$CF$_3$, LiC$_6$F$_5$SO$_3$, LiO$_2$CCF$_3$, LiSO$_3$F, LiB(C$_6$H$_5$)$_4$, LiCF$_3$SO$_3$, or a combination thereof.

17. A battery, comprising:
a positive electrode;
a negative electrode; and
the gel electrolyte as claimed in claim 9 disposed between the positive electrode and the negative electrode.

\* \* \* \* \*